3,108,783
**TOOL FOR PULLING TOGETHER AND
SPREADING SPACED FLANGES**
Charles E. Foust and Robert G. Mathews, both of
1098 Cumberland Drive, Clarksville, Tenn.
Filed Nov. 16, 1960, Ser. No. 69,594
2 Claims. (Cl. 254—67)

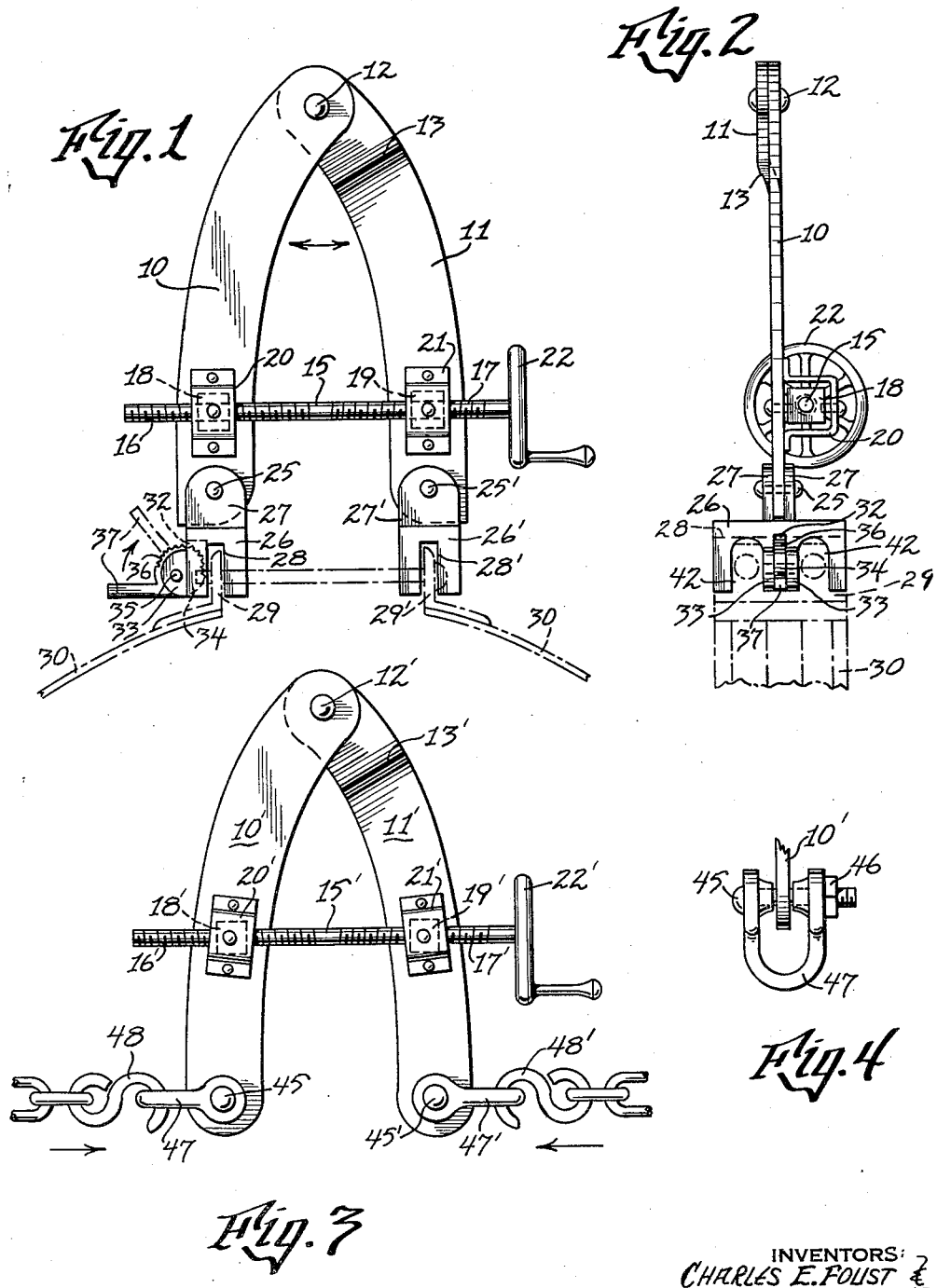

This invention relates to a tool for pulling together and spreading the ends of articles, and more particularly to a manually operated tool for pulling together and spreading the ends of articles, such as pipe clamping rings, chains and cables.

One object of this invention is to provide a tool, which may be easily and quickly, manually operated to positively pull together or positively spread apart articles continuously and evenly.

Another object of this invention is to provide a tool for pulling together and spreading the ends of articles in which the tool has self-aligning elements for consistently applying tension or compression upon the ends of the articles.

A further object of this invention is to provide a tool for pulling together and spreading the ends of articles having interchangeable end engaging members for different types of articles.

Another object of this invention is to provide a tool for pulling together and spreading the ends of articles in which the tool is light weight, portable, economical and may be quickly and easily operated.

Further objects and advantages of the invention will be apparent from the following description, taken in conjunction with the drawings, wherein:

FIG. 1 is a side elevation of the invention adapted to operate upon a clamping ring for a pipe;

FIG. 2 is a left end elevation of the invention disclosed in FIG. 1;

FIG. 3 is a side elevation of a modified form of the invention; and

FIG. 4 is an enlarged fragmentary right edge elevation of the left clevis disclosed in FIG. 3, detached from the chain.

Referring now to the drawings in more detail, a pair of arcuate arms 10 and 11 of substantially equal length are pivotally connected at their upper ends by means of a pin 12. Since the arms 10 and 11 are substantially flat and are of uniform thickness, the arm 11 is slightly bent at 13 so that the lower free portions of the arms 10 and 11 may freely swing or pivot in the same plane.

In order to pivotally move the arms 10 and 11 toward and away from each other, an elongated rod 15 is provided having a right-hand threaded portion 16 adjacent one end and a left-hand threaded portion 17 adjacent its other end. It will be understood that the directions of the threaded portions 16 and 17 may be reversed, so long as they are oppositely threaded. The threaded portion 16 is adapted to threadedly engage a correspondingly internally threaded nut 18, while the threaded portion 17 is adapted to threadedly engage a similar nut 19. The nut 18 is journalled to freely rotate in a plane parallel to the pivotal plane of the arms 10 and 11, in a bracket, such as the stirrup-bracket 20, fixed to the arm 10 adjacent its lower free end. In a like manner, the nut 19 is journalled in a similar aligned bracket 21 fixed to the arm 11 at a corresponding distance from its free end, in order that the nut 19 may freely rotate in the same plane as the nut 18 and that the nuts 18 and 19 may be pivoted into alignment for threadedly receiving the rod 15. A hand wheel 22 is fixed to one end of the rod 15 so that it may be manipulated to rotate the rod 15 about its longitudinal axis in either direction for moving the arms 10 and 11 toward and away from each other.

The free end of the arm 10 is pivotally connected by means of a pin 25 to a jaw 26. The jaw 26 comprises a block having upstanding ears 27 spaced to receive the free end of the arm 10, the ears 27 and arm 10 having aligned apertures for receiving the pin 25 to permit the jaw 26 to freely swing in the plane of the arms 10 and 11. The jaw 26 is provided with a longitudinal recess 28 of substantially rectangular cross section, opening in the bottom and both ends of the jaw 26 and extending normal to the pivotal plane of the arms 10 and 11. The dimensions of the recess 28 are such that it will slide over the upstanding flange 29 of a clip on one end of a circular clamping band 30 of the type adapted to clamp the ends of corrugated metal pipe. In a like manner, jaw 26' having ears 27' and recess 28' is pivotally connected to the free end of arm 11.

In order to provide a tighter engagement between the recess 28 and its corresponding flange 29, a slot 32 may be formed transversely through the outside wall of the jaw 26 to intersect the recess 28. Parallel lugs 33 extend from each side of the slot 32 to receive an eccentric cam 34 rotatably supported on a pin 35. A portion of the cam surface is knurled or roughened to engage the outside surface of the flange 29 when the cam 34 is rotated into locking position by means of the handle 37. The cam 34 is disclosed in unlocked position in solid lines in FIGS. 1 and 2, and in dashed-line locked position in FIG. 1. The cam 34 is so mounted that, in locked position, the knurled surface 36 will bind tighter against the flange 29 upon any movement toward separation of the flange 29 and the jaw 26. Although the cam 34 is disclosed mounted only on the jaw 26, it will be understood that, if employed, cams will be mounted on both jaws 26 and 26'.

As best disclosed in FIG. 2, a pair of slots 42 are formed tranvsersely through the outside walls of the jaws 26 and 26' to intersect the longitudinal recesses 28 and 28'. Slots corresponding to and in alignment with slots 42 are also formed through the inside walls of jaws 26 and 26'. The dimensions of each slot 42 are such that a bolt may be inserted through the slots 42 and into mating holes in the flanges 29 and 29', while the jaws 26 and 26' engage their respective flanges, as indicated in FIG. 1.

Thus, by rotating the hand wheel 22, the jaws 26 and 26' may be finely adjusted so that the recesses 28 and 28' may be accurately aligned with and fitted over their respective flanges 29 and 29' when the band 30 is unstressed. If eccentric cams 34 are employed on jaws 26 and 26', then the handles 37 are raised until the knurled surfaces 36 engage and lock the flanges 29 and 29' in the jaws. In order to tighten the clamping band 30, the hand wheel 22 is turned to rotate the rod 15 to draw the threaded nuts 18 and 19, and consequently the arms 10 and 11, toward each other. As the hand wheel 22 is turned, the nuts 18 and 19 are pivoting relative to their respective brackets 20 and 21, the arms 10 and 11 are pivoting about the pin 12, and the jaws 26 and 26' are likewise pivoting about the pins 25 and 25' relative to the free ends of the arms 10 and 11, respectively. After the clamping band 30 is tightened, the bolts are inserted through the slots 42 in their mating holes in the flanges 29 and 29' until the bolts are secured. Then the handle 22 is turned slightly in the opposite direction until the recesses 28 and 28' are free and do not bind their respective flanges 29 and 29'. The jaws 26 and 26' are then completely removed from the flanges 29 and 29'. In order to remove the band 30 from the pipe, the procedure for tightening the band is reversed in order to spread the jaws 26 and 26' and the flanges 29 and 29' apart.

If the jaws 26 and 26' were fixed to their respective arms 10 and 11, the jaws would tend to slip off the flanges as they moved in an arc about the pipe. By pivotally attaching the jaws 26 and 26' to the arms 10 and 11, the jaws are self-aligning with the flanges 29 and 29'.

The pivotal mounting of the nuts 18 and 19 within the brackets 20 and 21 prevents binding of the rod 15. The hand wheel 22 affords a rapid means of turning the rod 15 in either direction.

It will be noted in FIGS. 1 and 2 that the outer edges of the free ends of the arms 10 and 11 are squared and depend substantially the full depth of the corresponding slots formed between the spaced ears 27 and 27', to limit the outward pivotal movement of the jaws 26 and 26', respectively. The adjacent or top surface of each jaw block 26 and 26' may form the bottom wall of the corresponding slot between the ears 27 and 27'. The inner edges of the free ends of the arms 10 and 11 are arcuate to permit the jaws 26 and 26' to pivot inward into alignment with each other, if desired. For this operation, it is important that the distance from the pivot pin 25 or 25' to any portion of the curved inner edge of the arm 10 or 11 be less than the shortest distance from the pivot pin 25 or 25' to the corresponding top of the block 26 or 26'. Moreover, the distance from the pivot pin 25 or 25' to the squared corner of the outer edge of the arm 10 or 11 must be greater than the shortest distance from the pivot pin 25 or 25' to the corresponding top of the block 26 and 26'. The extent of the outward pivotal movement of either block 26 or 26' may be controlled by varying the distance between the pivot pin 25 or 25' and the corresponding squared corner of the end of the arm 10 or 11.

FIGS. 3 and 4 disclose a modified form of the device in which the jaws 26 and 26' have been replaced by clevises 47 and 47' pivoted to the free ends of their respective arms 10' and 11' by means of pins 45 and 45' secured by means, such as a nut 46 (FIG. 4). Clevises 47 and 47' are adapted to receive the hooked ends of the respective chains 48 and 48' or the ends of any other articles, such as cables, wires, ropes, or larger bodies.

It will be apparent to those skilled in the art that various changes may be made in the invention, without departing from the spirit and scope thereof, and therefore the invention is not limited by that which is shown in the drawings and described in the specification, but only as indicated in the appended claims.

What is claimed is:
1. A tool for pulling together and spreading laterally opposed flanges comprising, first and second arms having opposed free ends, said free ends having inner arcuate edges opposing each other and outer squared edges directed away from each other, first and second elongated jaw blocks, pivotal connecting means on each jaw block comprising a slot having a bottom wall for receiving a corresponding free end therein, a pivot pin connecting each pivotal means with said corresponding free end to permit pivotal movement of said jaw blocks about the pivotal axes of said pins toward and away from each other in substantially the same plane, the shortest distance between the pivotal axis of each pin and said corresponding bottom wall being greater than the distance between said pivotal axis and any portion of the corresponding inner arcuate edge, and less than the greatest distance between said pivotal axis and the corresponding outer squared edge, each jaw block having an elongated recess with fixed opposed longitudinal walls normal to said plane and spaced apart slightly more than the thickness of the corresponding flanges, said recess opening away from said pivotal means to receive a flange, and means for positively moving said arms toward and away from each other substantially in said plane.

2. The invention according to claim 1 in which aligned slots are formed transversely through the longitudinal walls of said jaw blocks and intersecting said recesses, said slots being adapted to receive the passage of a bolt therethrough for engaging mating holes in said flanges.

References Cited in the file of this patent
UNITED STATES PATENTS

| | | |
|---|---|---|
| 187,551 | O'Donnell | Feb. 20, 1877 |
| 231,273 | Christmas | Aug. 17, 1880 |
| 538,451 | La Bauve | Apr. 30, 1895 |
| 1,037,615 | Grenier | Sept. 3, 1912 |
| 1,250,245 | Tollestrup | Dec. 18, 1917 |
| 1,656,319 | Cowley | Jan. 17, 1928 |
| 2,787,442 | Lewis | Apr. 2, 1957 |
| 3,051,444 | Stephenson | Aug. 28, 1962 |